United States Patent
Sjöström

(10) Patent No.: US 6,234,679 B1
(45) Date of Patent: May 22, 2001

(54) ROLLING BEARING WITH COATED ELEMENT

(75) Inventor: Hans Sjöström, Göteborg (SE)

(73) Assignee: SKF Nova AB, Gothenberg (SE)

( * ) Notice: Subject to any disclaimer, the term of this patent is extended or adjusted under 35 U.S.C. 154(b) by 0 days.

(21) Appl. No.: 09/442,481

(22) Filed: Nov. 18, 1999

(30) Foreign Application Priority Data

Nov. 18, 1998 (SE) .................................................... 9803957

(51) Int. Cl.⁷ ...................................................... F16C 33/34
(52) U.S. Cl. ........................ 384/565; 384/492; 384/569; 384/625; 384/913
(58) Field of Search ..................................... 384/565, 569, 384/492, 625, 913

(56) References Cited

U.S. PATENT DOCUMENTS

| 4,731,302 | 3/1988 | Weissmantel et al. . |
| 5,249,554 | 10/1993 | Tamor et al. . |
| 5,593,234 | 1/1997 | Liston ................................. 384/492 |

FOREIGN PATENT DOCUMENTS

| 43 27 440 A1 | 2/1995 | (DE) . |
| 195 00 576 A1 | 9/1995 | (DE) . |
| 197 02 852 A1 | 7/1997 | (DE) . |
| 718513 | 9/1993 | (EP) . |

*Primary Examiner*—Lenard A. Footland
(74) *Attorney, Agent, or Firm*—Burns, Doane, Swecker & Mathis, L.L.P.

(57) ABSTRACT

A rolling bearing made of bearing steel and incorporating an inner race, an outer race positioned coaxially about the inner race and a set of rolling bodies positioned in the annular space between and in rolling contact with the inner and outer race, wherein at least one of the inner race, the outer race and the set of rolling bodies is provided with a surface coating incorporating an exterior carbon nitride layer and an intermediate layer interposed between the carbon nitride layer and the surface of the coated component(s), said intermediate layer being hexagonal boron carbon nitride.

12 Claims, 1 Drawing Sheet

ROLLING BEARING WITH COATED ELEMENT

This application claims priority under 35 U.S.C. §§119 and/or 365 to Application No. 9803957-1 filed in Sweden on Nov. 18, 1998; the entire content of which is hereby incorporated by reference.

BACKGROUND OF THE INVENTION

The present invention relates to bearing components and bearings made of bearing steel. More particularly, the present invention relates to bearings including an inner race, outer race positioned coaxially about the inner race and a set of rolling bodies positioned in the space between and in rolling contact with the inner and said outer race.

The discussion that follows contains certain references to various structures and methods. However, nothing that follows should be construed as an admission of prior art.

Many bearing function under poor tribological conditions, which results in bearing wear. The primary method for meeting this problem is to provide proper lubrication. However, for many applications operating at high speeds, high load and elevated temperatures, the available lubricants will not give a satisfactory result.

Attempts have been made to provide rolling bearing components with hard surface coatings, e.g.—carbides and nitrides, such as TiN, TiC, CrN. Although nitrides and carbides have high hardness and a good resistance to abrasive wear, they also pose a problem. Because their friction coefficients are rather high, which in combination with the high hardness, leads to excessive abrasive wear on components in rolling or sliding contact with these coated elements.

Moreover, sufficient adhesion between coatings of this type and the substrate are not obtained unless the application temperature of the coating is high (over 400° C.). At these temperatures, the comparatively low alloyed bearing steels will be subjected to excessive softening and dimensional changes.

Therefore such coating materials do not give a satisfactorily result.

Coatings of diamond-like carbon (DLC) have been used to coat sliding bearing components. The adhesion of this material against the underlying bearing steel material is sufficient for sliding bearing applications, but as a result of the much higher contact stresses in rolling bearings, in combination with the fact that DLC is not thermally stable and have inferior elastic properties, it has proven itself to have insufficient adhesion for most rolling applications as the DLC coating will flake off.

Some have sought to apply DLC coatings to rolling bearings by providing specific interlayers. However, the limited elastic properties of the DLC coating have meant a limited usefulness in such applications.

One objective of the present invention is to provide a well functioning rolling bearing component made of bearing steel. The component may one or more of an inner race, an outer race positioned coaxially about the inner race and a set of rolling bodies positioned in the annular space between and in rolling contact with the inner and outer races, and which has an increased life also under severe operation conditions with poor lubrication.

SUMMARY OF THE INVENTION

These and other objects have been achieved by providing a rolling bearing having components made of bearing steel comprising an inner race, an outer race positioned coaxially about the inner race, and a set of rolling bodies positioned in the annular space between and in rolling contact with said inner race and said outer race. At least one of the inner race, the outer race and the set of rolling bodies is provided with a coated surface comprising an exterior carbon nitride layer and an intermediate layer interposed between the carbon nitride layer and the surface of the component(s), the intermediate layer comprising hexagonal boron carbon nitride.

The above objects, and others can also be achieved by providing a steel bearing component comprising a surface coated with a carbon nitride layer and an intermediate layer interposed between the carbon nitride layer and the component surface, the intermediate layer comprising hexagonal boron carbon nitride.

BRIEF DESCRIPTION OF THE DRAWING FIGURES

DESCRIPTION OF THE PREFERRED EMBODIMENTS

Figure 1:
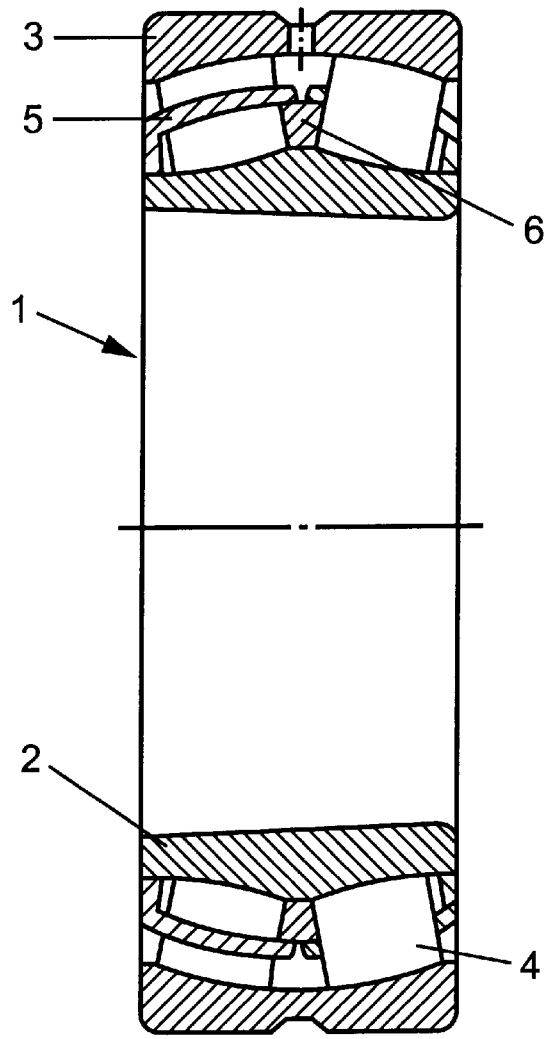
FIG. 1 is a cross-sectional view of a rolling bearing construction.

FIG. 1 shows, in cross section, a rolling bearing 1, comprising an inner race 2, an outer race 3, and two rows of spherical rollers 4 arranged between and in contact with the race. Also shown in the drawing is cage 5, for spacing apart the rollers 4 and a guide ring 6 preventing the opposed faces of the rollers in the two rows from contacting each other.

Figure 2:
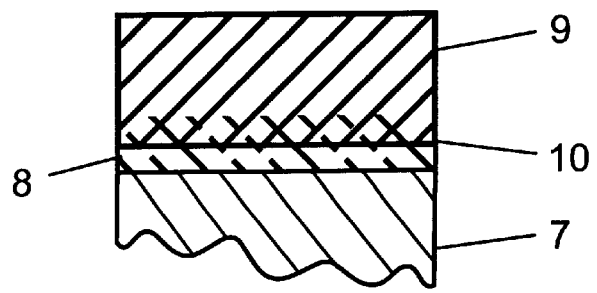
FIG. 2 is a schematic cross-sectional illustration of a coated substrate formed consistent with the principles of the present invention.

FIG. 2 schematically shows an enlarged section of a substrate or portion 7 of any of the components rings 2, 3, rollers 4, cage 5, guide ring 6 and/or (not shown) seals or side shields for a rolling bearing.

The portion 7 is only shown as a fragmentary cross-sectional view and it is composed by an ordinary bearing grade steel. On an outer or exposed surface of the substrate or component 7 there is applied, preferably by means of a vapor depositing technique, a well adhering layer 8 of hexagonal boron carbon nitride. Upon this is deposited, preferably in the same operational step, a layer 9 of carbon nitride, which during the deposition is allowed to agglomerate with the boron carbon nitride to form a diffuse intermediate layer 10, wherein the boron carbon nitride and the carbon nitride are amalgamated, thereby creating a strong bond between the boron carbon nitride with its good adhesion to steel, and the carbon nitride with its very good tribological properties.

A rolling bearing according to the invention is thus made of bearing steel and incorporates an inner race, an outer race positioned coaxially about the inner race, and a set of rolling bodies positioned in the annular space between and in rolling contact with said inner race and said outer race. At least one component such as one of the inner race, the outer race and the set of rolling bodies is provided with a surface coating incorporating an exterior carbon nitride layer and an intermediate layer interposed between the carbon nitride layer and the steel surface of the coated component(s). The intermediate layer preferably being hexagonal boron carbon nitride —B—N—C.

In accordance with the invention it is also envisaged that at least one of the other associated bearing components, such as cage, seals, guide ring, etc., might also optionally be provided with a corresponding coating layer.

In one embodiment, the carbon nitride comprises Fullerene-like carbon nitride. While the adhesion between carbon nitride itself and bearing steel is rather poor, the carbon nitride gives very good tribological conditions, and improved surface hardness and wear resistance. However it also was found that a very thin layer (10–100 nm) of boron carbon nitride, preferably of the hexagonal type, has extremely good adhesive properties with bearing steel.

It was discovered through investigation and experimentation that it is possible to combine the excellent adhesive properties of the boron carbon nitride with the very good tribological and wear resistance properties of carbon nitride by using a vapor deposition technique and it is possible to apply, in a single operation, a thin boron carbon nitride layer of about 10–100 nm to the substrate or component and thereupon a carbon nitride layer of about 0.1–5 μm. The interface between the boron carbon nitride and the carbon nitride forming a diffuse, gradual transition or agglomeration zone.

It was found that this agglomeration zone formed by the intermixed boron carbon nitride and carbon nitride layers, gave a very strong retention of the carbon nitride layer, which had an ability to withstand high speed and high load even under elevated temperatures and poor lubrication conditions, without resulting in flaking phenomena or the like.

The carbon nitride used preferably has a N content of 10–25% by weight and the remainder carbon. The Fullerene-like phase of carbon nitride is achieved at temperatures between 50 and 600° C. and is obtained in the form of curved graphite flakes with substitutional N.

The invention is not limited to the embodiments described and illustrated herein. To the contrary, numerous modifications and variants are possible. The present invention should be considered as limited only by the scope and spirit of the appended claims.

What is claimed is:

1. A rolling bearing having components made of bearing steel comprising an inner race, an outer race positioned coaxially about the inner race, and a set of rolling bodies positioned in an annular space between and in rolling contact with the inner race and the outer race, at least one of the inner race, the outer race and the set of rolling bodies is provided with a coated surface comprising an exterior carbon nitride layer and an intermediate layer interposed between the carbon nitride layer and the surface of the component(s), the intermediate layer comprising hexagonal boron carbon nitride.

2. The rolling bearing of claim 1, further comprising associated bearing components including at least one of a cage, seals, and a guide ring, under operation of the bearing, the associated component(s) adapted to contact at least one of the bearing races and the rolling bodies, the at least one of the associated bearing components is provided with a surface coating incorporating an exterior carbon nitride layer and an intermediate layer interposed between the carbon nitride layer and the surface of the associated component(s), the intermediate layer comprising hexagonal boron carbon nitride.

3. The rolling bearing of claim 1, further comprising an interface between the intermediate layer and the exterior layer forming a diffuse transition in which the material from the different layers are diffusely amalgamated into each other.

4. The rolling bearing of claim 1, wherein at least one of the exterior and intermediate layers have been applied on the component by means of a vapor deposition technique.

5. The rolling bearing of claim 1, wherein the intermediate layer has a thickness of 10–100 nm, whereas the total thickness of the coating is 0.1–5 μm.

6. The rolling bearing of claim 1, wherein the carbon nitride has a content of N of 10–25% by weight, and the remainder being C.

7. A steel bearing component comprising a surface coated with an exterior carbon nitride layer and an intermediate layer interposed between the carbon nitride layer and the component surface, the intermediate layer comprising hexagonal boron carbon nitride.

8. The bearing component of claim 7, wherein the carbon nitride comprises a Fullerene-like carbon nitride.

9. The bearing component of claim 8, wherein at least one of the exterior and the intermediate layers are formed by means of a vapor deposition technique.

10. The bearing component of claim 7, wherein an interface is formed between the intermediate layer and the exterior layer, the interface forming a diffuse transition in which the material from the different layers are diffusely amalgonated into each other.

11. The bearing component of claim 7, wherein the intermediate layer has a thickness of 10–100 nm, whereas the total thickness of the coating is 0.1–5.0 μm.

12. The bearing component of claim 7, wherein the carbon nitride has an N content of 10–25% by weight, with the remainder being C.

* * * * *